US00RE36688E

United States Patent [19]

Pellerin

[11] E Patent Number: Re. 36,688

[45] Reissued Date of Patent: May 9, 2000

[54] APPARATUS FOR USE IN EXTRACTING LIQUID FROM CLOTH OR OTHER WATER-ABSORBING GOODS

[75] Inventor: Norvin L. Pellerin, New Orleans, La.

[73] Assignee: Pellerin Milnor Corporation, Kenner, La.

[21] Appl. No.: 08/335,633

[22] Filed: Nov. 8, 1994

Related U.S. Patent Documents

Reissue of:

[64] Patent No.: 5,318,705
Issued: Jun. 7, 1994
Appl. No.: 07/943,710
Filed: Sep. 11, 1992

[51] Int. Cl.[7] ..... B01D 33/00

[52] U.S. Cl. ..... 210/360.1; 210/372; 68/23 R

[58] Field of Search ..... 68/210, 23 R, 68/142, 58, 24, 96, 21, 242; 210/360.1, 372, 376, 373; 494/4 S

[56] References Cited

U.S. PATENT DOCUMENTS

| | | | |
|---|---|---|---|
| 2,692,494 | 10/1954 | Candor | 68/21 |
| 2,743,599 | 5/1956 | Bilde et al. | 68/21 |
| 2,749,735 | 6/1956 | Candor | 68/21 |
| 2,755,991 | 7/1956 | Tholl et al. . | |
| 2,771,766 | 11/1956 | Dunlap . | |
| 2,867,106 | 1/1959 | Stone, Jr. et al. . | |
| 2,976,712 | 3/1961 | Smith et al. . | |
| 3,089,327 | 5/1963 | Stilwell, Jr. . | |
| 3,546,903 | 12/1970 | Hertig . | |
| 3,760,950 | 9/1973 | Hine et al. . | |
| 3,816,070 | 6/1974 | Candor et al. | 68/21 |
| 4,202,187 | 5/1980 | Hukuzawa et al. . | |
| 4,240,913 | 12/1980 | Burke et al. . | |
| 4,771,615 | 9/1988 | Fukuzawa et al. . | |
| 4,941,333 | 7/1990 | Blessing . | |
| 4,951,458 | 8/1990 | Steinort . | |

FOREIGN PATENT DOCUMENTS

| | | | |
|---|---|---|---|
| 140130 | 1/1947 | Australia | 68/21 |
| 0083302 | 9/1988 | European Pat. Off. . | |
| 923247 | 2/1955 | Germany . | |
| 1159381 | 12/1963 | Germany . | |
| 1963811 | 7/1967 | Germany . | |
| 6605248 | 2/1970 | Germany . | |
| 2801594 | 6/1982 | Germany . | |
| 3803195 | 8/1989 | Germany . | |
| 4033689 | 2/1992 | Japan . | |
| 82519 | 7/1956 | Netherlands . | |

*Primary Examiner*—Frankie L. Stinson
*Attorney, Agent, or Firm*—Browning Bushman

[57] ABSTRACT

There is disclosed apparatus for use in extracting liquid from cloth or other water-absorbing goods wherein the goods are contained within a perforated drum rotatably mounted in an outer housing. Circumferentially spaced, essentially rigid, hollow preforms having parts therein extend lengthwise of the inner side of the drum, and bellows are connected to the inner side of the drum each to cover a preform. Fluid pressure is selectively supplied to the ribs to expand the bellows or withdrawn from the ribs to radially collapse the bellows onto the preforms.

10 Claims, 2 Drawing Sheets

Figure 1:
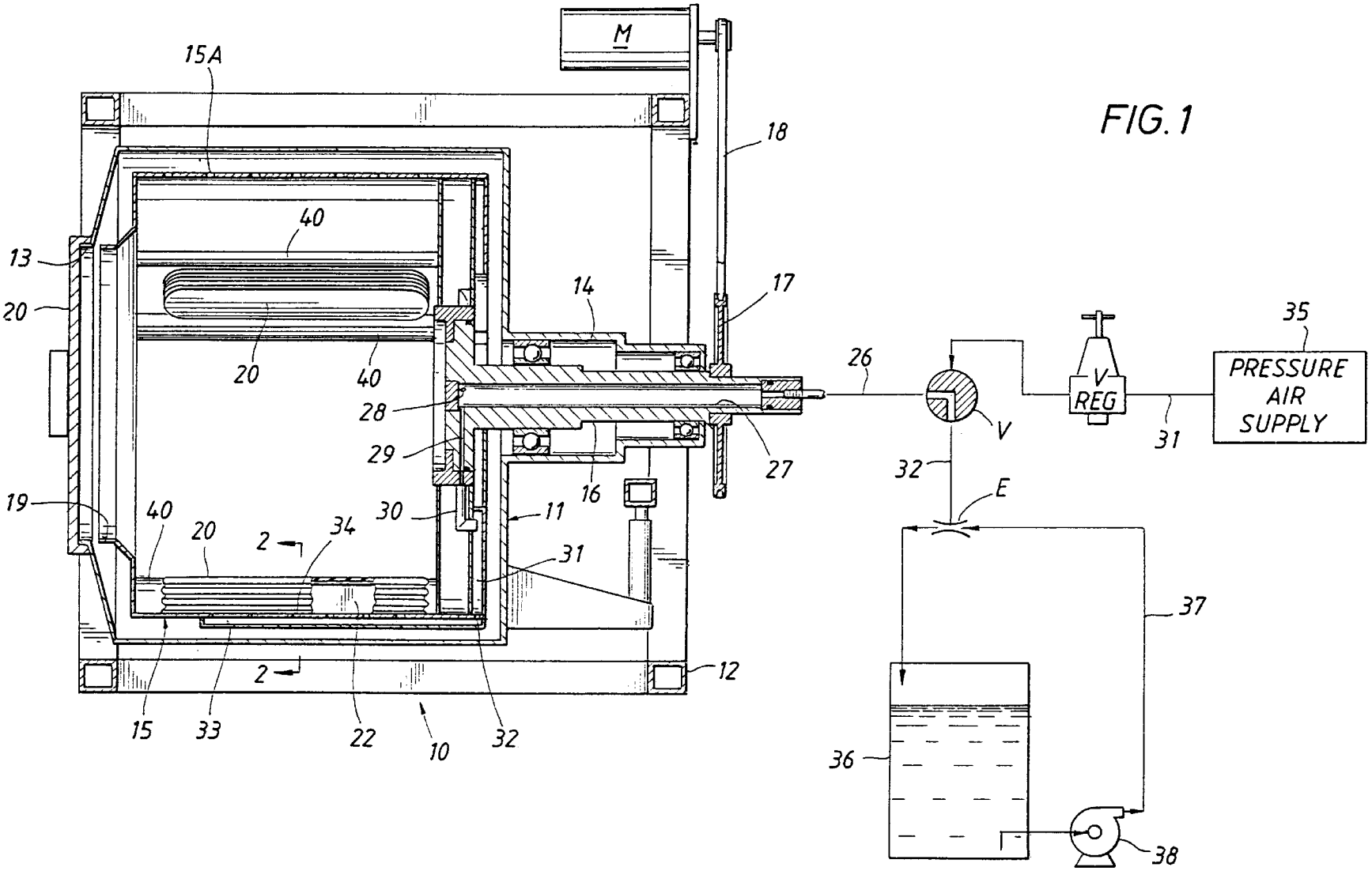

PRESSURE AIR SUPPLY
35
31
V
REG
37
38
V
E
32
36
26
18
17
27
12
M
14
16
11
31
32
10
28
29
30
40
22
34
40
2
2
20
15A
20
33
40
15
13
20
19

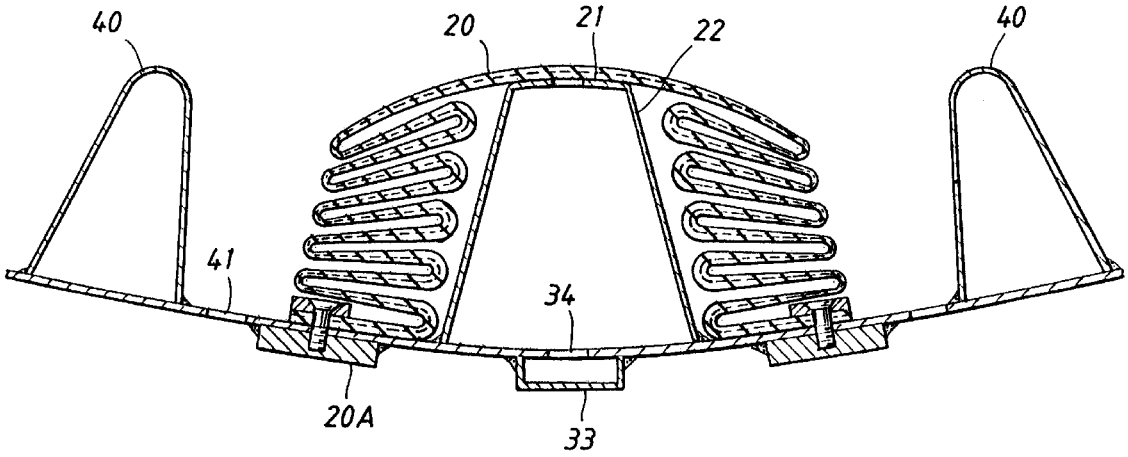
FIG. 2
FIG. 3
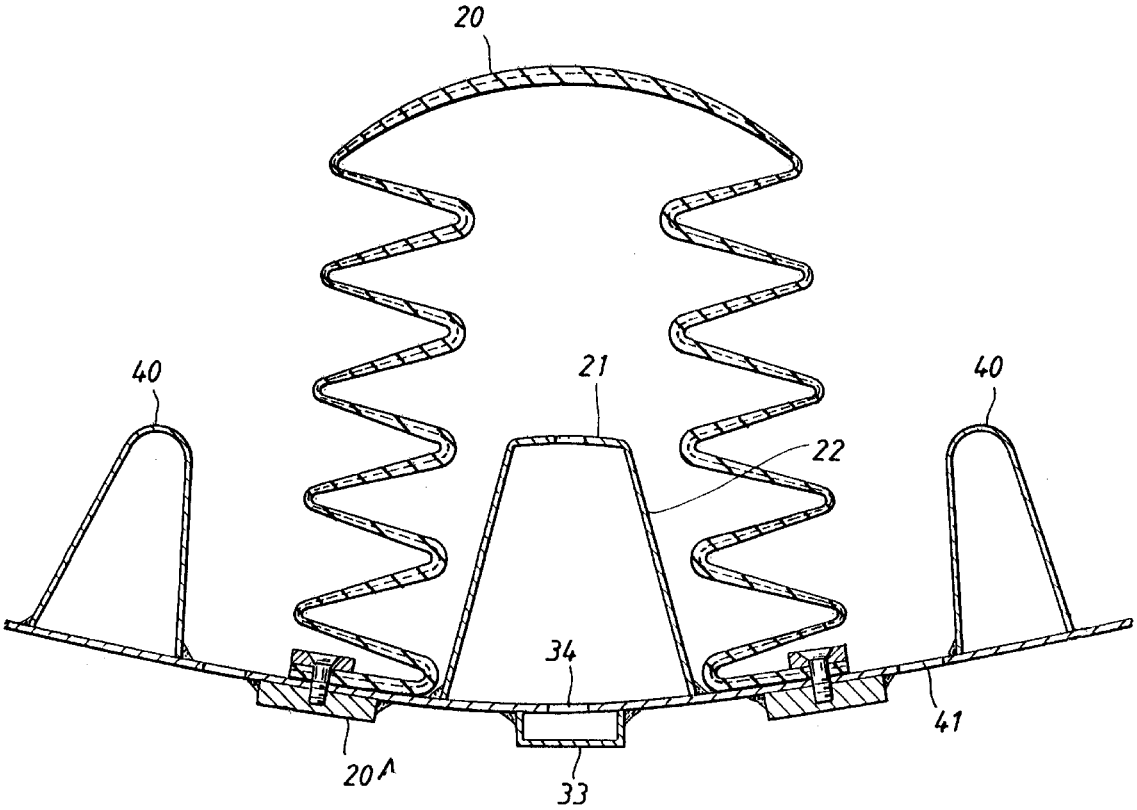

APPARATUS FOR USE IN EXTRACTING LIQUID FROM CLOTH OR OTHER WATER-ABSORBING GOODS

Matter enclosed in heavy brackets [ ] appears in the original patent but forms no part of this reissue specification; matter printed in italics indicates the additions made by reissue.

This invention relates generally to apparatus for use in extracting liquid from cloth or other water-absorbing goods of the type in which a perforated drum for containing the goods is mounted for rotation in a housing to cause liquid in the wet goods to be forced outwardly through the perforations and into the housing by centrifugal force during a high-speed spin or extraction cycle of the drum. More particularly, it relates to improvements in apparatus of this type having means for loosening goods which may be stuck to the inner side of the drum when the spin cycle is completed, whereby they may be removed from the drum without operator intervention.

Apparatus of this type may comprise a centrifugal extractor used to extract liquid from goods laundered in a separate laundry washing machine, or it may comprise a combination washer and extractor. In either case, during the spin cycle, the wet goods become plastered against the inner side of the drum with such great force that they may not fall free upon completion of the spin cycle, thus requiring an operator to scrape or peel them from the inner side of the drum.

It has therefore been proposed to provide means of some type by which they may be unstuck at the completion of the spin cycle without requiring that they be scraped or peeled from the drum wall. For example, DE 2,801,594 shows apparatus of this type in which a vacuum may be pulled on the inside of the drum to lift the goods from its inner side of the drum. On the other hand, U.S. Pat. No. 3,546,903 uses a nozzle for directing a stream of water onto the outer side of the perforated drum to force the goods away from the inner side.

It has also been suggested to free the goods by ribs arranged about the inside of the drum which are essentially collapsed as the drum rotates during a spin cycle, but expanded when the spin cycle is completed. See, for example, U.S. Pat. No. 3,760,950. DE 1,961,811 shows a washer/extractor in which the ribs are in the form of bellows disposed over springs which are collapsed during the spin cycle as a result of centrifugal force but permitted to expand upon completion of the spin cycle to press the ribs against the goods.

Although the bellows permit the ribs to be radially extended a greater distance, there is a greater risk that they might fold over or be caught in the springs as they collapse, and it is therefore the primary object of this invention is to provide apparatus of this type in which the ribs in the form of bellows are moved between and located in their collapsed and expanded positions in a more reliable fashion.

A more particular object is to provide apparatus of the type above described in which the retracted ribs are protected from damage by the goods as they are tumbled as the drum is rotated at a relatively slow speed during loading, washing and/or discharge cycles.

These and other objects are accomplished, in accordance with the illustrated embodiment of the invention, by apparatus of the type described in which ribs in the form of bellows are adapted to be moved by the selective supply or exhaust of fluid to or from the inside of the bellows between expanded positions and contracted positions in which they collapse radially onto essentially rigid preforms. As illustrated, the preforms are hollow and have perforations therein, and the means for supplying or exhausting fluid pressure is connected to the interior thereof.

In the case of a washer/extractor, barriers extend lengthwise of the interior of the drum on opposite sides of each bellows to protect the collapsed bellows from abrasion by the tumbling goods during rotation of the drum. More particularly, the barriers extend inwardly from the interior of the drum to essentially the same extent as the collapsed bellows, and ports are formed in the drum intermediate the bellows and barriers on opposite sides of the bellows so as to prevent liquid from accumulating between them.

In the drawings, wherein like reference characters are used to designate like parts:

FIG. 1 is a longitudinal sectional view of apparatus constructed in accordance with the present invention including a system for selectively applying air pressure to or withdrawing air pressure from the inside of each of the bellows, and with the bellows shown in collapsed position on the preforms during a spin cycle;

FIG. 2 is an enlarged, cross-sectional view of part of the apparatus, as seen along broken lines 2—2 of FIG. 1, and showing one of the bellows radially collapsed upon a preform in response to the withdrawal of air pressure through the inside of the preform; and FIG. 3 is a view similar to FIG. 2, but upon the supply of air pressure through the preform to the inside of the bellows to cause it to be extended inwardly to the expanded position for loosening goods which may be stuck to the inner side of the drum.

With reference now to the details of the above described drawings, the overall apparatus shown in FIG. 1, and indicated in its entirety by reference character 10, comprises housing 11 mounted in a frame 12 and having an access opening 13 in the left end thereof and a sleeve 14 at its opposite end which is generally axially aligned with the access opening 13. As well-known in apparatus of this type, the housing may be yieldably suspended from the frame.

The apparatus also includes a drum 15 which has perforations 15A about its periphery and is supported by the frame for rotation therein about its axis which is generally aligned with the axis of the housing. For this purpose, the drum has a shaft 16 extending from its closed end and journalled within and sealed with respect to the sleeve 14 for rotation by a motor M connected to a sheave 17 about the shaft by a belt 18. The left-hand end of the drum has an access opening 19 therein aligned with access opening 13 in the housing, and a door 20 across the access opening 13 in the housing may be moved to an open position to permit goods to be inserted into or removed from the drum.

To the extent above described, the apparatus 10 is a washer/extractor of more or less conventional construction wherein goods are first washed in the drum and liquid is then extracted therefrom during a high-speed spin cycle. During the extraction cycle, the drum is rotated at a very high speed, which may be in the order of 1,000 rpm, to cause the liquid to be moved by centrifugal force through the perforations and into the housing, and then, as in the wash cycle, drained from the housing. As previously described, upon completion of the spin cycle, goods plastered against the inner side of the drum may be difficult to remove therefrom.

As also previously described, the drum includes ribs which are spaced about its inner side and which are caused to move between retracted positions, during a spin cycle, and expanded positions, upon completion of the spin cycle, to force the goods from the inner side of the drum whereby they may be easily removed therefrom following completion of the extraction process. In accordance with the novel aspects of this invention, each rib comprises a bellows 20 which may be made of rubber or other flexible material capable of being moved between the expanded position of FIG. 3 and the collapsed position of FIGS. 1 and 2. More particularly, an essentially rigid, hollow preform 21 having holes 22 therein is mounted on the inner side of the drum within the bellows 20 so that the bellows, when retracted, is caused to radially collapse upon the preform and thus held in a position from which it may be subsequently expanded, thus preventing the bellows from being folded over.

Although the preform is shown to be hollow and essentially dome-shaped, it may take other forms, such as a "T." Thus, its purpose is to prevent the rib from being radially collapsed against the concave inner surface of the drum.

As shown in FIGS. 2 and 3, the open end of each bellows is fastened to the drum by clamps 20A or the like to provide an air-tight enclosure about the preform. Air may be supplied to or withdrawn from the interior of each of the bellows by a system which includes, as shown in FIG. 1, a conduit 26 connecting with a passageway 27 through the shaft 16. More particularly, the opposite end of the axial passageway is closed at 28 and the shaft has radial passageways 29 connecting passageway 27 with tubes 30 connecting with an annular space 31 formed on the closed end of the drum. The space 31 in turn is connected by ports 32 with a series of chambers 33 formed on the outside of the drum opposite each of the preforms, and ports 34 are formed in the drum to connect each chamber with the inside of a preform 21, whereby air may pass through the ports in the preform either into or out of the bellows 20.

In the system shown in FIG. 1, a two-way valve V is installed on the outer end of the conduit for alternately connecting it and thus the interior of the bellows with means such as an eductor E for creating a suction in order to withdraw pressure fluid in the bellows. Thus, with the valve shown in the position of FIG. the bellows is caused to collapse on the preforms, while, on the other hand, with the valve in its alternate position, compressed air from a source 36 is supplied into the bellows to cause the bellows to expand. As shown, the eductor for withdrawing air through the conduit 32 is operated in response to the circulation of water or other liquid within a reservoir 36 arranged in a loop 37 by means of a pump 38.

As previously described, particularly in the case of a washer/extractor, barriers 40 are installed on the inner side of the drum on opposite sides of each bellows. More particularly, these barriers comprise hollow, dome-shaped ribs which extend generally parallel to each of the bellows and inwardly to a height substantially the same as the height of the preform and thus the collapsed bellows, whereby only the top side of the bellows is exposed to abrasive action of the goods being tumbled in the drum.

Ports 41 are formed in the drum intermediate each barrier and the adjacent side of the bellows 20, thus providing a means by which water or liquid which might otherwise accumulate between them may pass outwardly of the drum. The barriers are preferably close enough to the sides of the bellows to prevent goods from accumulating between them.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. Apparatus for extracting liquid from cloth goods, comprising an outer housing, a perforated drum for containing the goods rotatably mounted in the housing, and means for so rotating said drum, said drum having circumferentially spaced, essentially rigid preforms [extending lengthwise of] *on* its inner [interior] *side*, bellows each connected to the drum to cover a preform, and means for selectively supplying fluid under pressure to the interior of the bellows to expand the bellows and withdrawing fluid under pressure therefrom to radially collapse the bellows on the preforms.

2. Apparatus as defined in claim [1] *9*, including barriers extending lengthwise of the interior of the drum on opposite sides of each bellows to protect the collapsed bellows from abrasion by the goods during rotation of the drum.

3. Apparatus as defined in claim 2, wherein the barriers extend inwardly from the interior of the drum to essentially the same extent as the collapsed bellows.

4. Apparatus as defined in claim 3, wherein ports are formed in the drum intermediate the bellows and barriers on opposite sides of the bellows.

5. Apparatus of the character defined in claim 1, wherein the preforms are hollow and have ports therein, and the means for selectively supplying and exhausting fluid connects with the interiors of the preforms so as to pass through the ports therein.

6. Apparatus as defined in claim [5] *10*, including barriers extending lengthwise of the interior of the drum on opposite sides of each bellows to protect the collapsed bellows from abrasion by the goods during rotation of the drum.

7. Apparatus as defined in claim 6, wherein the barriers extend inwardly from the interior of the drum to essentially the same extent as the collapsed bellows.

8. Apparatus as defined in claim 7, wherein ports are formed in the drum intermediate the bellows and barriers on opposite sides of the bellows.

*9. Apparatus of the character defined as in 1, wherein the preforms and bellows are substantially equally spaced and extend substantially lengthwise of the inner side of the drum.*

*10. Apparatus of the character defined in claim 5, wherein the preforms and bellows are substantially equally spaced apart and extend lengthwise of the inner side of the drum.*

* * * * *